United States Patent
Takizawa et al.

(10) Patent No.: US 7,138,211 B2
(45) Date of Patent: Nov. 21, 2006

(54) SOLIDIFYING MATERIAL FOR CELL ELECTROLYTE SOLUTION, AND CELL COMPRISING THE SOLIDIFYING MATERIAL

(75) Inventors: Minoru Takizawa, Tokyo (JP); Yoshifumi Sugito, Tokyo (JP); Naomi Oguma, Tokyo (JP); Seiji Doi, Tokyo (JP); Sachio Yoshikawa, Tokyo (JP); Michiei Nakamura, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 273 days.

(21) Appl. No.: 10/829,171

(22) Filed: Apr. 22, 2004

(65) Prior Publication Data

US 2004/0197666 A1    Oct. 7, 2004

Related U.S. Application Data

(62) Division of application No. 09/988,139, filed on Nov. 19, 2001, now Pat. No. 6,797,436.

(30) Foreign Application Priority Data

| Nov. 21, 2000 | (JP) | ............................... 2000-354591 |
| Nov. 21, 2000 | (JP) | ............................... 2000-354592 |
| Apr. 24, 2001 | (JP) | ............................... 2001-126099 |

(51) Int. Cl.
*H01M 10/40* (2006.01)

(52) U.S. Cl. .................. 429/303; 442/76; 442/164; 442/171; 429/189; 429/300; 429/303

(58) Field of Classification Search ................ 429/189, 429/300, 303; 442/76, 164, 171
See application file for complete search history.

(56) References Cited

U.S. PATENT DOCUMENTS

| 4,252,917 | A  | 2/1981  | Takizawa et al. |
| 5,026,780 | A  | 6/1991  | Takizawa et al. |
| 5,196,484 | A  | 3/1993  | Giles et al. |
| 5,543,045 | A  | 8/1996  | Fukutomi et al. |
| 5,770,631 | A  | 6/1998  | Fukutomi et al. |
| 6,387,570 | B1 | 5/2002  | Nakamura et al. |
| 6,465,126 | B1 | 10/2002 | Jannasch et al. |
| 6,465,595 | B1 | 10/2002 | Takizawa et al. |

OTHER PUBLICATIONS

Vassel et al, Electrochimica Acta., vol. 45, 2000, pp. 1527-1532, no month.

*Primary Examiner*—Andrew T. Piziali
(74) *Attorney, Agent, or Firm*—Oblon, Spivak, McClelland, Maier & Neustadt, P.C.

(57) ABSTRACT

A solidifying material for a cell electrolyte solution is a block copolymer, which comprises, as segments A, a polymer non-compatible with the cell electrolyte solution and, as segments B, a polymer compatible with the cell electrolyte solution. The solidifying material absorbs and solidifies the cell electrolyte solution. A smallest unit of the block copolymer is A-B-A. To each of the segments B, at least one group selected from the group consisting of a carboxyl group, an ester group, a hydroxyl group, a sulfonic group, an amino group, a cyclic carbonate group and a polyoxyalkylene group is bonded via a —S— bond or a —C— bond.

7 Claims, No Drawings

SOLIDIFYING MATERIAL FOR CELL ELECTROLYTE SOLUTION, AND CELL COMPRISING THE SOLIDIFYING MATERIAL

This application is a division of application Ser. No. 09/988,139, filed Nov. 19, 2001, now U.S. Pat. No. 6,797,436.

BACKGROUND OF THE INVENTION a) Field of the Invention

This invention relates to a solidifying material for cell or battery (hereinafter collectively called "cell") electrolyte solution and a cell comprising the solidifying material as a constituent element. The term "cell electrolyte solution" may hereinafter be referred to simply as an "electrolyte solution", and the term "solidifying material for an electrolyte solution" may hereinafter be referred to simply as "solidifying material".

b) Description of the Related Art

As a cell electrolyte is conventionally in a liquid form, it is sealed in a case from the standpoint of safety. To safely hold the electrolyte solution over a long time, the case is required to be strongly built. As a result, it has heretofore been difficult to form a cell into a thin structure. It has recently been proposed to have an electrolyte solution absorbed in a high molecular substance such that the electrolyte is solidified. This approach is expected not only to avoid leakage of the electrolyte solution from cells and to provide the cells with improved safety but also to achieve higher design tolerances on cell configurations, cell thickness reductions, improvements in durability, and higher outputs owing to increases in area.

SUMMARY OF THE INVENTION

The conventional high molecular substances for solidifying electrolyte solutions have crosslinked structures, are insoluble in solvents, and do not melt under heat. Accordingly, they cannot be formed into thin films of uniform thickness. Use of a solid electrolyte in the form of a thin film is indispensable for the construction of a cell of smaller dimensions, especially of a reduced thickness. Because the above-described high molecular substances cannot be formed into thin films, it has heretofore been difficult to obtain a solid electrolyte in the form of a thin film of uniform thickness.

An object of the present invention is, therefore, to provide a solidifying material for a cell electrolyte solution, which can be formed into a thin film or sheet (which may hereinafter be collectively called "film") of uniform thickness and can easily absorb and solidify the electrolyte solution.

Another object of the present invention is to provide a cell making use of such a solidifying material.

The above-described objects can be achieved by the present invention as will be described hereinafter.

Described specifically, the present invention, in a first aspect thereof, provides a solidifying material for a cell electrolyte solution, characterized in that the solidifying material is a block copolymer comprising, as segments A, a polymer non-compatible with the cell electrolyte solution and, as segments B, a polymer compatible with the cell electrolyte solution, and absorbs and solidifies the cell electrolyte solution, a smallest unit of the block copolymer is A-B-A, and to each of the segments B, at least one group selected from the group consisting of a carboxyl group, an ester group, a hydroxyl group, a sulfonic group, an amino group, a cyclic carbonate group and a polyoxyalkylene group is bonded via a —S— bond or a —C— bond; and a cell comprising the solidifying material as a constituent element.

The present invention, in a second aspect thereof, also provides a solidifying material for a cell electrolyte solution, characterized in that the solidifying material is a graft copolymer comprising, as segments A, a polymer non-compatible with the cell electrolyte solution and, as segments B, a polymer compatible with the cell electrolyte solution, and absorbs and solidifies the cell electrolyte solution, and to each of the segments B, at least one group selected from the group consisting of a carboxyl group, an ester group, a hydroxyl group, a sulfonic group, an amino group, a cyclic carbonate group and a polyoxyalkylene group is bonded; and a cell comprising the solidifying material as a constituent element.

The present invention, in a third aspect thereof, also provides a solidifying material for a cell electrolyte solution, characterized in that the solidifying material comprises a film or sheet of a polymer having properties that the polymer is insoluble in the cell electrolyte solution but the polymer absorbs and solidifies the cell electrolyte solution, and a backing reinforcing the film or sheet, and the backing is a woven fabric, a nonwoven fabric or a porous film; and a cell comprising the solidifying material as a constituent element.

The solidifying materials according to the present invention can be dissolved or finely dispersed in appropriate solvents or can be caused to melt by heat, so that they can be formed into films each of which has a desired thickness. Namely, the solidifying materials according to the present invention can be formed into thin films of uniform thickness, and can easily absorb and solidify cell electrolyte solutions. As these films can be provided with enhanced strength by reinforcing them with backings, these films can each be formed with a still reduced thickness. These film-shaped solidifying materials can conveniently absorb and solidify electrolyte solutions, and the thus-solidified electrolyte solutions have good electrical conductivity and are useful as solid electrolytes for cells. Upon absorption of electrolyte solution in each of these films, the volume of the film increases in the direction of its cross-section, in other words, toward an associated electrode, so that the contact between the electrode and the film is rendered closer an surer. Especially when a woven fabric is used as a backing, a reduction in electrical conductivity can be minimized because the woven fabric has adequate strength despite its large opening area and moreover, a solidifying material having a large particle size can also be used for the preparation of a coating formulation which is useful for forming a film.

DETAILED DESCRIPTION OF THE INVENTION AND PREFERRED EMBODIMENTS (First Aspect of the Present Invention)

The solidifying material according to the first aspect of the present invention is characterized in that the solidifying material is a block copolymer comprising, as segments A, a polymer non-compatible with the cell electrolyte solution and, as segments B, a polymer compatible with the cell electrolyte solution, and absorbs and solidifies the cell electrolyte solution; a smallest unit of the block copolymer is A-B-A; and to each of the segments B, at least one group selected from the group consisting of a carboxyl group, an ester group, a hydroxyl group, a sulfonic group, an amino group, a cyclic carbonate group and a polyoxyalkylene group is bonded via a —S— bond or a —C— bond.

The block copolymer employed as a raw material for the solidifying material is a block copolymer of segments A and segments B. Each segment B contains an unsaturated double bond group. Such feed block copolymers are disclosed, for example, in Kogyo Zairyo (Industrial Materials), "Tokushu—Netsukasosei Elastomers (Special Edition—Thermoplastic Elastomers", 24(12) 1976 and Sekiyu Gakkai Shi (Bulletin of the Japan Petroleum Institute), 18, 565 (1975). These block copolymers are high molecular substances each of which has a structure such as (Segment A)-(Segment B)-(Segment A) that the segment B, which has an unsaturated double bond, is flanked at two points thereof between the segments A, as expressed under the name of the so-called tele-block copolymer type, multi-block copolymer type or star-shaped block copolymer type. Further, a single-block copolymer composed of segments A and segments B may also be mixed in these high molecular substances. Preferably, each of these high molecular substances has a weight average molecular weight of from 10,000 to 500,000.

As the segments A which constitute the solidifying material according to the first aspect of the present invention, a polymer selected from polystyrene, polyethylene or polypropylene is preferred. As the segments B, on the other hand, a polymer selected from polybutadiene, polychloroprene or polyisoprene is preferred. The segments A are in a crystallized form in the block copolymer, and keep the block copolymer physically crosslinked at room temperature. Further, these segments A have high non-compatibility (insolubility) with a cell electrolyte solution, for example, a thick aqueous solution of potassium hydroxide.

The content of the segments A in the block copolymer can preferably be in a range of from 0.5 to 70 wt. %. A content lower than 0.5 wt. % is too low to exhibit the crystallization effect of the segments A for the copolymer. A content higher than 70 wt. %, on the other hand, results in a solidifying material having a smaller liquid absorption rate for the electrolyte solution. The preferred content is in a range of from 1.0 to 50 wt. %.

The segments B which also constitute the solidifying material according to the first aspect of the present invention is a polymer selected from the group consisting of polybutadiene, polychloroprene and polyisoprene, and the polymer can preferably have a weight average molecular weight of from 10,000 to 300,000. The content of the segments B in the block copolymer may be 99.0 to 50 wt. %, preferably 95.5 to 30 wt. %.

Each segment B has a group, which is compatible with the electrolyte solution, via a —S— bond or a —C— bond. Examples of the compatible group can include a carboxyl group, ester groups, a hydroxyl group, a sulfonic group, an amino group, cyclic carbonate groups, and ether groups. Illustrative of the ether groups are homopolymers and block or random copolymers of polyoxyethylene groups or polyoxypropylene groups. The ester group, through its hydrolysis or the like, can make the segment B exhibit compatibility with the electrolyte solution. These compatible groups should be suitably selected and combined depending upon the electrolyte solution. For example, electrolyte solutions include both aqueous and non-aqueous systems. It is preferred to select such compatible groups as permitting absorption of a solution of one of these systems and to introduce them into the segments B.

As an illustrative method for the introduction of the above-described compatible groups into the segments B, a compatible compound containing one mercapto group (—SH), acid sodium sulfite (sodium hydrogensulfite) or maleic anhydride is added to double bonds in the segments B. Examples of the mercapto-containing compound can include thioglycolic acid, thiolactic acid, thiomalic acid, thiosuccinic acid, thiosalicylic acid, mercaptopropane-sulfonic acid, thioethanolamine, thioglycol, and thioglycerin. In the presence of a free radical generator, for example, azobisisobutyronitrile, azobiscyanovaleric acid, benzoyl peroxide, lauroyl peroxide, cumene hydroperoxide, ammonium persulfate or an alkali salt thereof, or hydrogen peroxide, or by simply heating, the mercapto compound, maleic anhydride or acid sodium sulfite is added to the segments B to obtain the solidifying material according to the first aspect of the present invention.

The introduction of polyethylene oxide groups or polypropylene oxide groups into the segments B via —C— bonds or —S— bonds can be effected by introducing hydroxyl groups or carboxyl groups into the copolymer in accordance with the above-described method and then addition-polymerizing ethylene oxide or propylene oxide to the groups so introduced. The polyethylene oxide groups or polypropylene groups so added may preferably have a weight average molecular weight in a range of from 200 to 1,000.

Upon introduction of the compatible groups, it is preferred to conduct the introduction by using a solvent. Preferred examples of the solvent can include cyclohexane, methylcyclohexane, toluene, xylol, terpene, pentane, naphthene, kerosene, methyl ethyl ketone, acetone, tetrahydrofuran, dimethylformaldehyde, dioxolane, dioxane, ethylcellosolve, diethylcellosolve, ethyl acetate, propyl acetate, butyl acetate, butyl alcohol, propyl alcohol, isopropyl alcohol, ethyl alcohol, methanol, and water.

The solidifying material according to the first aspect of the present invention obtained as described above can take any form, including a form in which the solidifying material is dissolved in an aqueous system, including a form in which the solidifying material is dispersed in water, a form in which the solidifying material is dispersed in a solvent, a form in which the solidifying material is dissolved in a solvent, and a powdery form. The production process itself of the solidifying material obtained as described above is disclosed in JP 1-168968 A in the name of Dainichiseika Color & Chemicals Mfg. Co., Ltd.

(Second Aspect of the Present Invention)

The solidifying material according to the second aspect of the present invention is characterized in that the solidifying material is a graft copolymer comprising, as segments A, a polymer non-compatible with the cell electrolyte solution and, as segments B, a polymer compatible with the cell electrolyte solution, and absorbs and solidifies the cell electrolyte solution; and to each of the segments B, at least one group selected from the group consisting of a carboxyl group, an ester group, a hydroxyl group, a sulfonic group, an amino group, a cyclic carbonate group and a polyoxyalkylene group is bonded.

Illustrative of the segments A are polystyrene, polyethylene, polypropylene, poly(meth)acrylate esters and polyacrylonitrile, each of which has a weight average molecular weight of form 3,000 to 20,000 and contains an α, β-ethylenically unsaturated group at an end thereof. A weight average molecular weight lower than 3,000 is too low to make the segments A exhibit their crystallization-dependent, physical crosslinking effect in the graft copolymer. A weight average molecular weight higher than 20,000, on the other hand, makes it difficult to product the graft copolymer. The content of the segments A may preferably be in a range of from 1 to 70 wt. %. A content lower than 1 wt. % cannot exhibit the crosslinking effect of the segments A through crystallization, while a content higher than 70 wt. % leads to a solidifying material having a small absorption for an electrolyte solution. Contents outside the above range are not preferred accordingly. More preferably, the content is in a range of form 2.5 to 50 wt.%.

Examples of a monomer, which has a group compatible with the electrolyte solution and is to be graft-copolymerized with the segments A, can include (meth)acrylic acid, maleic acid, vinylbenzoic acid, (meta)styrenesulfonic acid, 2-acryloylamido-2-methyl-1-propanesulfonic acid, methacryloxypropylsulfonic acid, vinylsulfonic acid, alkali metal salts such as polyoxyethylene alkyl ether sulfosuccinic acid or alkaline metal salts thereof, 4-vinylpyridine, 2-vinylpyridine, dimethylaminoethyl methacrylate, diethylaminoethyl methacrylate, (2-oxo-1,3-dioxolan-4-yl)methyl (meth)acrylate, 2-hydroxyethyl (meth)acrylate, and 2-hydroxypropyl (meth)acrylate.

From these monomers, a preferred monomer is selected depending upon the electrolyte solution. Electrolyte solutions include both aqueous and non-aqueous systems. It is preferred to graft-polymerize such a monomer as permitting absorption of a solution of one of these systems. Two or more of the monomers may be graft-copolymerized as needed.

When the solidifying material according to the second aspect of the present invention is used for a non-aqueous electrolyte solution represented by an electrolyte solution for lithium cells, a monomer usable for the production of the segments B is a monomeric ester having a general polymerizable unsaturated group. Illustrative of such a monomeric ester are methyl (meth)acrylate, ethyl (meth)acrylate, n-butyl (meth)acrylate, i-butyl (meth)acrylate, t-butyl (meth)acrylate, lauroyl (meth)acrylate, stearyl (meth)acrylate, acrylonitrile, styrene, vinylacetate, (2-oxo-1,3-dioxolan-4-yl)methyl (meth)acrylate, (meth) acryloyl-containing polyethylene glycol (weight average molecular weight: 200 to 1,000), (meth)acryloyl-containing polypropylene glycol (weight average molecular weight: 200 to 1,000), and (meth) acryloyl-containing polyethylene glycol/polypropylene glycol copolymer (weight average molecular weight: 200 to 1,000).

Among these, monomers important for the formation of segments B, which are suited for the transfer of ions in a non-aqueous electrolyte employed in cells, are monomers containing polyoxyalkylene groups which include at least a polyethylene glycol group. Use of a monomer, which contains a polyethylene glycol group as is or contains a copolymer of ethylene oxide and propylene oxide, is preferred.

To enhance the insolubility of the solidifying material according to the second aspect of the present invention in the electrolyte solution, a polyfunctional monomer may also be copolymerized in a small proportion upon conducting the graft copolymerization. Examples of such a polyfunctional monomer can include aromatic divinyl compounds such as divinylbenzene and divinylnaphthalene; and (meth)acrylates such as polyethylene glycol di(meth)acrylate, 1,6-hexanediol di(meth)acrylate, tripropylene glycol di(meth)acrylate, hydroxypivalate ester neopentyl glycol di(meth)acrylate, trimethylol propane tri(meth)acrylate, pentaerythritol tri(meth)acrylate, and dipentaerythritol hexa(meth)acrylate.

These polyfunctional monomers can be added preferably in a proportion of 5 wt.% or less of the above-mentioned monofunctional monomer.

As a polymerization initiator usable upon graft copolymerization, the same polymerization initiator as that described above in connect ion with the first aspect of the present invention can also be used. Further, as a solvent usable upon graft copolymerization, the same solvent as that described above in connection with the first aspect of the present invention can also be used.

The solidifying material according to the second aspect of the present invention obtained as described above can take any form, including a form in which the solidifying material is dissolved in an aqueous system, including a form in which the solidifying material is dispersed in water, a form in which the solidifying material is dispersed in a solvent, a form in which the solidifying material is dissolved in a solvent, and a powdery form. The production process itself of the solidifying material obtained as described above is disclosed in JP 2-1715 A and JP 2-265909 in the name of Dainichiseika Color & Chemicals Mfg. Co., Ltd.

The solidifying material according to each of the first and second aspects of the present invention may preferably be in the form of a film. Examples of a film-forming process can include the casting process in which a solution or dispersion of the solidifying material is cast and dried, the extrusion process in which the solidifying material in a powdery form is dispersed in a thermoplastic resin and the resulting dispersion is extruded, and a process in which such a dispersion is formed into a film by calendering. Especially in order to impart excellent strength to a film to be obtained, a natural or synthetic resin insoluble in the electrolyte can be added to the solution or powder of the solidifying material.

Illustrative of the natural or synthetic resin are natural rubber, and synthetic rubbers such as chloroprene, isoprene, butyl rubber, styrene-butadiene copolymer, acrylonitrile-butadiene copolymer, and hydrogenation products thereof. These copolymers can each be of any one of bonding types of random bonding, block bonding and graft bonding. The content of the natural or synthetic resin is preferably 85 wt. % or less based on the solidifying material. A content higher than 85 wt. % results in a film-shaped solidifying material, the electrical conductivity of which is too low to use it as a solidifying material. As a still further additive, a plasticizer can also be used. Especially, process oil having chemical resistance is effective.

The thickness of each film obtained as described above is 0.0001 to 2 mm. A thickness smaller than 0.0001 mm involves a potential problem in that a homogeneous film may not be obtained. A thickness greater than 2 mm, on the other hand, makes it difficult to form the solidifying material into a film and, even if such a film is obtained, a long time is needed for the absorption of the electrolyte. Moreover, such a great thickness cannot provide a thin cell.

(Third Aspect of the Present Invention)

The solidifying material according to the third aspect of the present invention is characterized in that the solidifying material comprises a film or sheet of a polymer having properties the that polymer is insoluble in the cell electrolyte solution but the polymer absorbs and solidifies the cell electrolyte solution, and a backing reinforcing the film or sheet; and the backing is a woven fabric, a nonwoven fabric or a porous film. Preferred examples of the above-described solidifying material can be the block copolymer in the first aspect of the present invention and the graft copolymer in the second aspect of the present invention. Other polymers can also be used.

Illustrative of such other polymers are those obtained by crosslinking hydrophilic polymers (i.e., so-called superabsorbent polymers). As these superabsorbent polymers, conventionally known superabsorbents are all usable, and no particular limitation is imposed thereon. Illustrative are starch-based graft copolymers such as a hydrolysis product of starch-acrylonitrile graft copolymer, starch-acrylic acid graft copolymer, starch-styrenesulfonic acid graft copolymer, starch-vinylsulfonic acid graft copolymer, and starch-acrylamide copolymer; cellulose derivatives such as cellulose-acrylonitrile graft copolymer, cellulose-styrenesulfonic acid graft copolymer, and a crosslinked product of carboxymethylcellulose; hyaluronic acid, agarose, and collagen; polyvinyl alcohol derivatives, such as crosslinked polyvinyl alcohol polymer and polyvinyl alcohol supersorbent gel/elastomer; crosslinked polyacrylic acid polymer, sodium acrylate-vinyl alcohol copolymer, saponified product of polyacrylonitrile polymer, hydroxyethyl methacrylate polymer, maleic anhydride (co)polymers, vinylpyrrolidone (co) polymers, crosslinked polyethylene glycol-diacrylate polymer, crosslinked polypropylene glycol-diacrylate polymer, ester-base polymers, amide-based polymers, poly[(2-oxo-1,3-dioxolan-4-yl)methyl (meth)acrylate], poly(N,N'-dimethyl-acrylamide), poly(N-vinylacetamide); and crosslinked products thereof. These supersorbent polymers can absorb electrolyte solutions. Each of these superabsorbent polymers can be fixed on a backing, which will be described subsequently herein, by using a dispersion in which the polymer has been dispersed with an appropriate dispersant in a non-aqueous medium.

In cadmium-nickel cells or nickel-hydrogen secondary cells, uncrosslinked copolymers each of which has been obtained using acrylic acid (or an acrylate salt), acrylamide or the like as a principal component and has a weight average molecular weight of from 50,000 to 1,000,000 can be used in place of the above-described (co)polymers.

In lithium cells as typical examples of those making use of non-aqueous electrolyte solutions, polymers obtained by copolymerizing monomeric esters or the like to the above-described polymers can be used. Examples of such monomeric esters can include methyl (meth)acrylate, ethyl (meth)acrylate, n-butyl (meth)acrylate, isobutyl (meth)acrylate, tert-butyl (meth)acrylate, lauroyl (meth)acrylate, stearyl (meth)acrylate, acrylonitrile, styrene, and vinyl acetate. To strengthen the solidifying material which has swollen as a result of absorption of the electrolyte solution, the above-described polyfunctional monomer may be copolymerized in a small proportion to crosslink the solidifying material.

As a polymerization catalyst, conventionally known radical polymerization initiators are all usable, and no limitation is imposed on the polymerization catalyst. Illustrative are azobisisobutyronitrile, azobiscyanovaleric acid, benzoyl peroxide, lauroyl peroxide, cumene hydroperoxide, ammonium persulfate and alkali salts thereof, and hydrogen peroxide. It is also possible to conduct the polymerization in the presence or absence of such a polymerization catalyst, under irradiation of ultraviolet rays, electron beams or radiation, or under heat.

When the electrolyte is an aqueous solution, the solidifying material may preferably contain ion-compatible groups. When the electrolyte is a non-aqueous solution, it is important for the solidifying material to contain polyethylene oxide groups which take part in the transfer of alkali ions. The amount of the electrolyte to be absorbed in the solidifying material can be in a range of from 5 to 5,000 wt. % based on the solidifying material. An absorption smaller than 5 wt. % cannot provide the solidified electrolyte solution with sufficient electrical conductivity, while an absorption greater than 1,000 wt. % results in swollen gel (the solidifying material in a swollen form as a result of absorption of the electrolyte solution) of considerably reduced strength.

Among the above-described solidifying materials, the solidifying material according to the third aspect of the present invention is generally used after mechanically grinding it to a particle size of 100 μm or smaller, preferably 50 μm or smaller. Inclusion of particles greater than 100 μm makes it difficult to form a thin, film-shaped solidifying material. On the other hand, the solidifying materials according to the first and second aspects of the present invention, each of which contains the segments A, feature good dispersibility in other polymers having no compatibility with the electrolyte solution, and their particle sizes can be easily reduced to several 100 nm to 10 μm.

The solidifying material according to the third aspect of the present invention is composed of the above-described solidifying material and the reinforcing backing. To improve the formability of the solidifying material and the strength of the thus-formed product, it is preferred to add, to the solidifying material, a polymer having elastomeric property but no compatibility with the electrolyte solution. Such a polymer can be any one of the natural and synthetic rubbers described above in connection with the first and second aspects of the present invention.

To reinforce the solidifying material, a woven fabric, a nonwoven fabric or a porous film can be used as a backing. The materials of these backings are, for example, polyethylene, polypropylene, polyamides, polyacrylonitrile, polyesters, polyvinyl chloride, and polyvinyl fluoride. Polyethylene, polypropylene and polyacrylonitrile are preferred for their excellent chemical resistance. In the case of an aqueous electrolyte solution, use of a hydrophilic backing with sulfonic groups or the like introduced therein is preferred in order to stabilize a coating formulation containing the solidifying material. Also preferred is a backing obtained by hydrolyzing a woven fabric or nonwoven fabric of polyacrylonitrile fibers at surfaces thereof with concentrated sulfuric acid or the like to introduce carboxyl groups therein. It is sufficient to apply such treatment only to fiber surfaces.

The woven fabric, nonwoven fabric or porous film as the backing may preferably have a thickness in a range of from 1 to 1,200 μm, more preferably from 2 to 400 μm. A thickness smaller than 1 μm makes it difficult to produce such a woven fabric, nonwoven fabric or porous film, while a thickness greater than 1,200 μm makes it difficult to form a thin, film-shaped solidifying material. The opening percentage of the nonwoven fabric may preferably in a range of from 95 to 10%. An opening percentage higher than 95% bring about only small reinforcing effect for the solidifying material, while an opening percentage lower than 10% leads to a film of extremely low electrical conductivity after absorption and solidification of the electrolyte. No particular limitation is imposed on the type of weave of the woven fabric, and examples of the weave can include plain weave, twilled weave, plain dutch weave and twilled dutch weave.

As a process for fixing the solidifying material on the reinforcing backing, (1) the reinforcing backing is dipped in a coating formulation (a dispersion of the solidifying material), is squeezed through a mangle or the like, and is then dried, (2) the coating formulation is coated onto the reinforcing backing by a gravure coater, a comma (knife) coater, a reverse coater or a blade coater, and is then dried, (3) the solidifying material is formed into a film in a manner by a known method, and the film is then bonded onto the reinforcing backing (for example, a cast film of the solidifying material is bonded under pressure through heated rolls or on a press. In some instances, the coating formulation can be fixed on the reinforcing backing by coating the coating formulation onto the reinforcing backing, immersing the thus coated reinforcing backing in a poor solvent to make the layer of the solidifying material porous, and then drying the reinforcing backing with the resultant porous layer carried thereon.

No particular limitation is imposed on a process for having the electrolyte solution absorbed in the solidifying material according to the present invention. For example, it is possible to have the electrolyte solution absorbed in the solidifying material in the form of a film reinforced with the reinforcing backing. As an alternative, it is also possible to add the electrolyte solution to a solution of the solidifying material and, subsequent to having the resultant solution absorbed in the reinforcing backing in the form of a film reinforced with the reinforcing backing, to conduct drying to obtain the solidifying material in the form of the film with the electrolyte solution absorbed therein. In some instances, it is also possible to have the electrolyte solution absorbed in the solidifying material by bonding a backing on each electrode of a cell, dipping the electrode in a solution of the solidifying material with the backing bonded on the electrode or coating the solution onto the backing on the electrode, and then conducting drying. This process is effective for improving the mutual contact between the electrode and the film, which has been formed by solidifying the electrolyte solution, at the interface therebetween.

Examples of a cell electrolyte to be absorbed in the above-described solidifying materials according to the first to third aspects of the present invention can include dilute sulfuric acid, potassium chloride, zinc chloride, potassium hydroxide, and lithium salts such as lithium perchlorate, $LiBF$, $LiPF_6$, $LiCF_3SO_3$, $LiN(CF_3SO_2)_2$ and $LiC(CF_3SO_2)_2$.

Illustrative of a medium in the above-described electrolyte solution are water, ethylene carbonate, propylene carbonate, dimethyl carbonate, ethyl methyl carbonate, dimethyl carbonate, γ-butyrolactone, methyl formate, methyl acetate, dimethyl sulfoxide, acetonitrile, N-methyl-pyrrolidone, tetrahydrofuran, diethylene glycol dimethyl ether, diethyl ether, 1,2-dimethoxyethane, and mixtures thereof.

The present invention will next be described more specifically based on Examples and Referential Examples, in which designations of "part" or "parts" and "%" are each on a weight basis unless otherwise specifically indicated.

(First Aspect of the Present Invention)

EXAMPLE 1

Production Example of a Solidifying Material a

A block copolymer (15 parts) composed of polystyrene, polybutadiene and polystyrene (polystyrene content: 30%, weight average molecular weight: 100,000) was dissolved in a mixed solvent formed of toluene (45 parts), cyclohexane (75 parts) and methyl ethyl ketone (35 parts), and the resulting solution was heated to 70° C. under a nitrogen gas stream. Into the solution, thioglycolic acid (20 parts) and azobisisobutyronitrile (0.3 part) were added, followed by an addition reaction for 12 hours. The reaction mixture was washed with a saturated aqueous solution of $Na_2SO_4$ to extract off unreacted thioglycolic acid from the reaction mixture. A 15% solution of potassium hydroxide in methanol was added to the thus-washed solution to convert carboxyl groups in the resultant solidifying material into potassium salts.

The solvent was then distilled off to adjust the solid content of the solution to 30%. As a result of an analysis of the solid matter in the solution by infrared absorption spectroscopy, the unsaturated groups of the polybutadiene were confirmed to be substantially eliminated. The particle size of particles suspended in the solution was measured by the light scattering method (Coulter A4 particle sizer). As a result, the particles were found to have a particle size of about 100 nm. Further, the solidifying material A taken out of the solution had a swelling index of 3,000% in deionized water.

Test 1 (Hot potassium hydroxide durability test)

The above-described solidifying material A was placed in a 20% aqueous solution of potassium hydroxide (electrolyte solution) and was continuously left over at 80° C. for 3 months. The absorption of the potassium hydroxide solution in the solidifying material A was 400%, and no changes were observed on the solidifying material A.

Test 2

The above-prepared solution of the solidifying material A, the solid content of which was 30%, and a solution (solid concentration: 20%) of a polystyrene-polybutadiene-polystyrene (SBR-TR) block copolymer (polystyrene content: 30%, weight average molecular weight: 100,000) in toluene/methyl ethyl ketone were mixed at the respective solid ratios (weight ratios) described in Table 1. The resultant liquid mixtures were cast and dried on glass plates to form films of about 100 μm in thickness, respectively.

In Table 1, liquid absorption rates of each film are shown together with the corresponding electrical conductivity data of the film in forms with liquids absorbed therein. The liquid absorption rates were determined as will be described next. Samples of the film were immersed in solutions (deionized water, and a 10% aqueous solution of potassium chloride), respectively. From weight changes of the film samples after the immersion, the liquid absorption rates were calculated. On the other hand, the electrical conductivities were determined as will be described next. Samples of the film were immersed at 25° C. for 24 hours in the 3 months in the solutions (the deionized water, and the 10% aqueous solution of potassium chloride), respectively. The film samples were taken out of the solutions, and were sandwiched between platinum plates of 1 $cm^2$. Across the respective film samples, voltages of 6V were applied, respectively. From the resulting currents, the electrical conductivities were calculated.

TABLE 1

| Solidifying material A/ SBR-TR (weight ratio) | Electrical conductivity of dry film ($\Omega^{-1}cm^{-1}$) | Electrical conductivity of film with deionized water absorbed ($\Omega^{-1}cm^{-1}$) | Electrical conductivity of film with aqueous solution of KCl absorbed ($\Omega^{-1}cm^{-1}$) | Absorption rate of deionized water (wt. %) | Absorption rate of aqueous solution of KCl (wt. %) |
|---|---|---|---|---|---|
| 0/100 | 0 | 0 | 0 | 0 | 0 |
| 25/75 | $1.2 \times 10^{-7}$ | $5.7 \times 10^{-3}$ | $5.8 \times 10^{-3}$ | 250 | 150 |
| 50/50 | $2.45 \times 10^{-6}$ | $1.29 \times 10^{-3}$ | $6.9 \times 10^{-3}$ | 450 | 200 |
| 75/25 | $6.94 \times 10^{-5}$ | $2.42 \times 10^{-3}$ | $4.36 \times 10^{-2}$ | 700 | 250 |
| 100/0 | $7.8 \times 10^{-4}$ | $5.1 \times 10^{-2}$ | $7.7 \times 10^{-2}$ | 3,000 | 300 |

It has been found from Table 1 that, when the content of the solidifying material A is 25% or higher, films with the respective solutions absorbed therein show sufficient electrical conductivities. From these results, it is understood that the solidifying material according to the present invention is useful as a solidifying material for electrolyte solutions in "CADNICA" cells (Ni—Cd cells) or nickel-hydrogen cells.

EXAMPLE 2

Production Example of a Solidifying Material B

A block copolymer (8 parts) composed of polystyrene-polybutadiene-polystyrene (polystyrene content: 30%, weight average molecular weight: 100,000) was dissolved in a mixed solvent formed of a petroleum-base solvent (50 parts) and methyl ethyl ketone (80 parts), and the resulting solution was heated to 70° C. under a nitrogen gas stream. Into the solution, thioglycerin (12 parts) and azobisisobutyronitrile (0.2 part) were added, followed by an addition reaction for 12 hours. After completion of the reaction, the reaction mixture was washed with a saturated aqueous solution of $Na_2SO_4$ to extract off unreacted thioglycerin from the reaction mixture.

Ethylene oxide was blown into the solution in the presence of an alkali catalyst to have 3 moles of ethylene oxide added per hydroxyl group. The particle size of fine particles in the solution was measured by the light scattering method (Coulter N4 particle sizer). As a result, the particle size was found to be about 200 nm. The swelling index of a solidifying material B, which had been taken out of the solution, in deionized water was 2,000%.

Incidentally, the solidifying material B can also absorb other solvents such as tetrahydrofuran, dimethylformamide and methyl ethyl ketone to about 500 to 1,000%. Therefore, the solidifying material B can also be used as a solidifying material for lithium cell electrolyte solutions containing aprotic solvents.

(Second Aspect of the Present Invention)

EXAMPLE 3

Production Example of a Solidifying Material C

Acrylic acid (30 parts), polyethylene glycol monomethacrylate (70 parts, weight average molecular weight: about 300) and methacryloyl-containing polystyrene (30 parts, weight average molecular weight: about 6,000) were dissolved in a mixed solvent formed of methyl ethyl ketone (100 parts) and cyclohexane (180 parts). Azoisobutyronitrile (1.1 parts) was mixed with the solution, followed by polymerization at 70° C. for 8 hours under a nitrogen gas stream. After cooling, the carboxyl groups in the resulting solidifying material C were neutralized with a 15% solution of caustic potash in methanol. The solvent was distilled off to adjust the solid content to 50%. The particle size of the solidifying material C in the solution was about 300 nm. The absorption rate of the solidifying material C, which had been taken out of the solution, in deionized water was about 2,000% based on its weight.

Test 3

The above-prepared solution of the solidifying material C and a solution (solid concentration: 20%) of a polystyrene-polybutadiene-polystyrene (SBR-TR) block copolymer (polystyrene content: 30%, weight average molecular weight: 100,000) in toluene/methyl ethyl ketone were mixed at the respective weight ratios (solid ratios) described in Table 2. The resultant liquid mixtures were formed by casting into films of about 100 μm in thickness, respectively. Measurements of their liquid absorption rates and electrical conductivities were conducted by the same methods as in Test 1.

TABLE 2

| Solidifying material C/ SBR-TR (weight ratio) | Electrical conductivity of dry film ($\Omega^{-1}cm^{-1}$) | Electrical conductivity of film with deionized water absorbed ($\Omega^{-1}cm^{-1}$) | Electrical conductivity of film with aqueous solution of KCl absorbed ($\Omega^{-1}cm^{-1}$) | Absorption rate of deionized water (wt. %) | Absorption rate of aqueous solution of KCl (wt. %) |
|---|---|---|---|---|---|
| 0/100 | 0 | 0 | 0 | 0 | 0 |
| 25/75 | $1.2 \times 10^{-11}$ | $1.1 \times 10^{-3}$ | $2.8 \times 10^{-3}$ | 250 | 160 |
| 50/50 | $1.0 \times 10^{-6}$ | $1.1 \times 10^{-2}$ | $1.4 \times 10^{-2}$ | 350 | 200 |
| 75/25 | $2.9 \times 10^{-6}$ | $2.2 \times 10^{-2}$ | $8.4 \times 10^{-2}$ | 510 | 220 |

It has been found from Table 2 that films, each of which contains the solidifying material of the present invention at 25% or more and contains an electrolyte solution absorbed therein, show sufficient electrical conductivities. From these results, it is understood that the solidifying material according to the present invention is useful as a solidifying material for electrolyte solutions in "CADNICA" cells (Ni—Cd cells) or nickel-hydrogen cells. Further, the solidifying material according to the present invention can also absorb solvents other than water, such as tetrahydrofuran, dimethylforamide and methyl ethyl ketone, at rates of from about 300 to 800%. Therefore, the solidifying material according to the present invention can also be used as a solidifying material for lithium cell electrolyte solutions containing aprotic solvents.

(Third Aspect of the Present Invention)

EXAMPLE 4

Production Example of a Solidifying Material D

Following the process disclosed in JP55-56615A, potassium thioglycolate was added to 95 mole % of the double bonds of polybutadiene in a block copolymer composed of polystyrene-polybutadiene-polystyrene (polystyrene content: 40%, weight average molecular weight: 150,000) to produce a solidifying material D.

A mixed solution of toluene/cyclohexane/MEK (35/35/30, weight ratio) and the solidifying material D were mixed to adjust the solid content to 25%. The average dispersed particle size of the solidifying material D in the solution was measured by the light scattering method (Coulter A4 particle sizer) (this will apply equally hereinafter). As a result, the average dispersed particle size was found to be about 100 nm. The swelling index of the solidifying material D in deionized water was 100-fold.

EXAMPLE 5

Production Example of a Solidifying Material E

In a similar manner as described above, thioglycol was added to 90 mole % of the double bonds of polybutadiene in a block copolymer polystyrene-polybutadiene-polystyrene (polystyrene content: 30%, weight average molecular weight: 100,000), and ethylene oxide (7 moles on average) was added to the hydroxyl groups of the thioglycol to produce a solidifying material E. The solidifying material E was mixed with a mixed solvent of toluene/cyclohexanone/MEK (35/35/30, weight ratio) to adjust the solid content to 20%. The average dispersed particle size of the solidifying material E in the solution was about 100 nm. The swelling index of the solidifying material E in deionized water was 10-fold.

EXAMPLE 6

Production Example of a Solidifying Material F

A solidifying material F composed of potassium acrylate, polyethylene glycol monomethacrylate (molecular weight: about 300) and methacryloyl-containing polystyrene (molecular weight: about 6,000) [weight ratio: 70/30/20%.] was mixed with a mixed solvent of methylethylketone/cyclohexane (60/40, weight ratio) to adjust the solid content to 50%. The average dispersed particle size of the solidifying material F in the solution was about 300 nm. The swelling index of the solidifying material F in deionized water was 30-fold.

EXAMPLE 7

Production Example of a Solidifying Material G

A crosslinked polymer composed of potassium acrylate/N,N'-methylenebisacrylamide (99.5/0.5%) was produced as a solidifying material G by radical polymerization. The content of water-soluble components in the solidifying material G was 20%. The swelling index of the solidifying material G in deionized water was 200-fold.

EXAMPLE 8

Production Example of a Solidifying Material H

A commercial, crosslinked isobutylene/potassium maleate copolymer (isobutylene/potassium maleate=1/1, molar ratio) was provided as a solidifying material H. The swelling index of the solidifying material H in deionized water was 320-fold.

EXAMPLE 9

Production Example of a Solidifying Material I

Crosslinked poly(N-vinylacetamide) obtained by radical polymerization was provided as a solidifying material I. The swelling index of the solidifying material I in deionized water was 25-fold.

EXAMPLE 10

Production Example of a Solidifying Material J

Poly(sodium acrylate) produced by reverse-phase polymerization and having an average particle size of 200 μm was provided as a solidifying material J. The swelling index of the solidifying material J in deionized water was 1,000-fold.

EXAMPLE 11

Production Example of a Solidifying Material K

An acrylic acid (89.1%)/styrene (10%)/divinylbenzene (0.9%, purity: 55%) copolymer, which had been obtained by bulk polymerization in the presence of azobutyronitrile as a polymerization initiator, was neutralized with potassium hydroxide, dried, and then ground. Fine particles of from 1 to 5 μm in particle size were provided as a solidifying material K. The swelling index of the solidifying material K in deionized water was 130-fold.

The following reinforcing backings were provided:

(1) Woven fabric obtained by sulfonating the surfaces of a polypropylene fabric (thickness: 0.122 mm, basis weight: 33 g/m$^2$, thread thickness: 0.080 mm, opening diameter: 0.098 mm).

(2) Nonwoven fabric (A) obtained by treating a nonwoven polyacrylonitrile fabric (thickness: 0.081 mm, basis weight: 45 g/m$^2$) with sulfuric acid to hydrolyze fibers at the surfaces thereof and forming potassium salts.

(3) Nonwoven fabric (B) obtained by sulfonating a nonwoven fabric (polypropylene fibers, thickness: 0.1 mm, basis weight: 33 g/m$^2$, air resistance: 3 sec/L) at surfaces thereof.

EXAMPLE 12

Production Example of a Solidifying Film 1

The solidifying material D, a polystyrene-polybutadiene block copolymer (styrene content: 30%, weight average molecular weight: 100,000; these will apply equally hereinafter) and an aromatic process oil were mixed at a weight ratio of 64/21/15 with toluene to adjust the solid content to 20%. A coating formulation of the solidifying material was obtained accordingly. The coating formulation was applied onto both sides of the woven fabric (1), and then dried at 80° C. for 24 hours to obtain a solidifying film 1 of 0.11 mm in thickness (coat weight: 100 g/m², weight basis; this will apply equally hereinafter).

EXAMPLE 13

Production Example of a Solidifying Film 2

The solidifying material F and the polystyrene-polybutadiene block copolymer were mixed at a weight ratio of 75/25 with toluene to adjust the solid content to 20%. A coating formulation was obtained accordingly. The coating formulation was applied onto both sides of the woven fabric (1), and then dried at 80° C. for 24 hours to obtain a solidifying film 2 of 0.15 mm in thickness (coat weight: 100 g/m²).

EXAMPLE 14 (Production example of a solidifying film 3)

The solidifying material G and the polystyrene-polybutadiene block copolymer were mixed at a weight ratio of 70/30 with toluene to adjust the solid content to 20%. A coating formulation was obtained accordingly. The coating formulation was applied onto both sides of the woven fabric (1), and then dried at 80° C. for 24 hours to obtain a solidifying film 3 of 0.2 mm in thickness (coat weight: 100 g/m²).

EXAMPLE 15

Production Example of a Solidifying Film 4

The solidifying material G and the polystyrene-polybutadiene block copolymer were dispersed at a weight ratio of 70/30 in toluene by a "Dynomill" (high-speed bead mill) to adjust the solid content to 20%. A coating formulation was obtained accordingly. The average dispersed particle size of the solidifying material in the coating formulation was about 30 μm. The coating formulation was applied onto both sides of the woven fabric (1), and then dried at 800 for 24 hours to obtain a solidifying film 4 of 0.2 mm in thickness (coat weight: 100 g/m²).

EXAMPLE 16

Production Example of a Solidifying Film 5

The solidifying material H and the polystyrene-polybutadiene block copolymer were dispersed at a weight ratio of 70/30 in tetrahydrofuran by a "Dynomill" (high-speed bead mill) to adjust the solid content to 30%. A coating formulation was obtained accordingly. The average dispersed particle size of the solidifying material in the coating formulation was about 25 μm. The coating formulation was applied onto both sides of the woven fabric (1), and then dried at 80° C. for 24 hours to obtain a solidifying film 5 of 0.12 mm in thickness (coat weight: 100 g/m²).

EXAMPLE 17

Production Example of a Solidifying Film 6

The solidifying material I and the polystyrene-polybutadiene block copolymer were dispersed at a weight ratio of 90/10 in tetrahydrofuran by a "Dynomill" (high-speed bead mill) to adjust the solid content to 30%. A coating formulation was obtained accordingly. The average dispersed particle size of the solidifying material in the coating formulation was about 35 μm. The coating formulation was applied onto both sides of the woven fabric (1), and then dried at 80° C. for 24 hours to obtain a solidifying film 6 of 0.12 mm in thickness (coat weight: 100 g/m²).

EXAMPLE 18

Production Example of a Solidifying Film 7

The solidifying material D, the polystyrene-polybutadiene block copolymer and an aromatic process oil were mixed at a weight ratio of 64/21/15 with toluene to adjust the solid content to 20%. A coating formulation was obtained accordingly. The coating formulation was applied onto both sides of the woven fabric (A), and then dried at 80° C. for 24 hours to obtain a solidifying film 7 of 0.9 mm in thickness (coat weight: 40 g/m²).

EXAMPLE 19

Production Example of a Solidifying Film 8

The solidifying material D, the polystyrene-polybutadiene block copolymer and an aromatic process oil were mixed at a weight ratio of 64/21/15 with toluene to adjust the solid content to 20%. A coating formulation was obtained accordingly. The coating formulation was applied onto both sides of the woven fabric (B), and then dried at 80° C. for 24 hours to obtain a solidifying film 8 of 0.12 mm in thickness (coat weight: 45 g/m²).

EXAMPLE 20

Production Example of a Solidifying Film 9

A solidifying film 9 (coat weight: 10 g/m²) was obtained in an similar manner as in Example 16 except that the nonwoven fabric (B) and the solidifying material K were used instead of the woven fabric (1) and the solidifying material H, respectively.

REFERENTIAL EXAMPLE 1

Production Example of a Solidifying Film 10

A cast film (solidifying film) 10 of 100 μm in thickness without the woven fabric in Example 12 was produced.

REFERENTIAL EXAMPLE 2

Production Example of a Solidifying Film 11

REFERENTIAL EXAMPLE 2

Production Example of a Solidifying Film 11

The solidifying material J and the polystyrene-polybutadiene block copolymer were dispersed at a weight ratio of 70/30 in toluene by a "Dynomill" (high-speed bead mill) to adjust the solid content to 30%. A coating formulation was obtained accordingly. The average dispersed particle size of the solidifying material in the coating formulation was about 200 μm. The coating formulation was applied onto both sides of the woven fabric (B), and then dried at 80° C. for 24 hours to obtain a solidifying film 11 (coat weight: 100 g/m$^2$, thickness: not accurately measurable as the thickness was not even).

Test 4

The individual solidifying films of the above-described Examples and Referential Examples were ranked in the following properties. The results are shown in Table 3.

(1) Strength of solidifying film

Using each film of 15 mm in width, its tensile strength was measured at a tensile speed of 100 mm/min by a strength measuring machine ("Strograph EL", trade name; manufactured by Toyo Seiki Seisaku-sho, Ltd.) under an environment of 20° C. and 60% RH. Each sample was measured 10 times, and an average of the measurement results was recorded as measurement data.

(2) Electrical conductivity

Samples of each film were immersed at 20° C. for 24 hours in a 10% aqueous solution of potassium chloride and deionized water, respectively, and were then taken out. The samples were each held between two platinum plates of 1 cm$^2$. From currents produced upon application of voltages of 6V across the samples, respectively, the electrical conductivities of the samples were calculated.

(3) Liquid Absorption Rate (%)

Each film was immersed at room temperature for 24 hours in a 10% aqueous solution of potassium chloride, and was then taken out. After the surfaces of the film were wiped, the weight of the film was determined. The liquid absorption rate (%) of the sample was calculated in accordance with the following formula.

<When no backing was included>

Liquid absorption rate (%)=[($W_1-W_0$)/$W_0$]×100

$W_1$: Weight of the film after liquid absorption (g/m$^2$)

$W_0$: Weight of the film before liquid absorption (g/m$^2$)

<When a backing was included>

Liquid absorption rate (*)=[($W_1-W_s-W_0$)/($W_0-W_s$)]×100

$W_1$: Weight of the film after liquid absorption (g/m$^2$)

$W_0$: Weight of the film before liquid absorption (g/m$^2$)

$W_s$: Weight of the backing (g/m$^2$)

(4) Surface Condition

Each coating formulation was applied onto a woven fabric or nonwoven fabric. The coated surface was visually observed. The surface condition was ranked in accordance with the following standards.

A: Extremely smooth and uniform.

B: Smooth and good uniformity.

C: Rugged, and coating was difficult.

TABLE 3

| | Film strength | Electrical conductivity ($\Omega^{-1}m^{-1}$) | | Liquid absorption rate (%) | | Surface condition |
|---|---|---|---|---|---|---|
| | | KCl solution | Water | KCl solution | Water | |
| Ex. 12 | 78 | 40 × 10$^{-4}$ | 10 × 10$^{-4}$ | 230 | 4,000 | A |
| Ex. 13 | 80.5 | 33 × 10$^{-4}$ | 7 × 10$^{-4}$ | 200 | 800 | A |
| Ex. 14 | 101 | 80 × 10$^{-4}$ | 45 × 10$^{-4}$ | 400 | 10,000 | B |
| Ex. 15 | 92 | 72 × 10$^{-4}$ | 35 × 10$^{-4}$ | 350 | 20,000 | B |
| Ex. 16 | 70 | 35 × 10$^{-4}$ | 20 × 10$^{-4}$ | 270 | 10,000 | B |
| Ex. 17 | 15 | 48 × 10$^{-4}$ | 15 × 10$^{-4}$ | 300 | 1,500 | A |
| Ex. 18 | 25 | 20 × 10$^{-4}$ | 10 × 10$^{-4}$ | 150 | 1,000 | A |
| Ex. 19 | 120 | 35 × 10$^{-4}$ | 7 × 10$^{-4}$ | 200 | 3,000 | A |
| Ex. 20 | 80 | 75 × 10$^{-4}$ | 50 × 10$^{-4}$ | 1,500 | 7,500 | A |
| Ref. Ex. 1 | 2 | 57 × 10$^{-4}$ | 50 × 10$^{-4}$ | 200 | 3,500 | A |
| Ref. Ex. 2 | 100 | 0.1 × 10$^{-4}$ (substantial scattering of measurement data) | Measurement was impossible | 350 | 10,000 | C |

Unit of film strength: N/1.5 cm

EXAMPLE 21

Production Example of Solidifying Film 12

The solidifying material E, the polystyrene-polybutadiene block copolymer, lithium perchlorate, ethylene carbonate and propylene carbonate were mixed at a weight ratio of 1/0.5/1/10/10 with tetrahydrofuran to adjust the solid content to 20%. A coating formulation was obtained accordingly. The coating formulation was applied onto both sides of the woven fabric (A), and then dried at 60° C. for 48 hours to obtain a solidifying film 12 of 0.12 mm in thickness. The film 12 had an ion conductivity of 2.0×10$^{-3}$ S/cm, and was by no means usable in a lithium cell.

The invention claimed is:

1. A solidifying material for a cell electrolyte solution, characterized in that said solidifying material comprises a film or sheet of a polymer having properties that said polymer is insoluble in said cell electrolyte solution but said polymer absorbs and solidifies said cell electrolyte solution, wherein said polymer is a block copolymer comprising, as segments A, a polymer non-compatible with said cell electrolyte solution and, as segments B, a polymer compatible with said cell electrolyte solution, and absorbs and solidifies said cell electrolyte solution; a smallest unit of said block copolymer is A-B-A; and to each of said segments B, at least one group selected from the group consisting of a carboxyl group, a hydroxyl group, a sulfonic group, an amino group and a cyclic carbonate group is bonded via a —S— bond or a —C— bond or a graft copolymer comprising, as segments A, a polymer non-compatible with said cell electrolyte solution and, as segments B, a polymer compatible with said cell electrolyte solution, and absorbs and solidifies said cell electrolyte solution; and to each of said segments B, at least one group selected from the group consisting of a carboxyl group, a hydroxyl group, a sulfonic group, an amino group and a cyclic carbonate group is bonded, and a backing reinforcing said film or sheet; and said backing is a woven fabric, a nonwoven fabric or a porous film.

2. A solidifying material according to claim 1, wherein said polymer is a polymer which comprises, as a principal component, polyacrylic acid, poly(N-vinylacetamide), poly [(2-oxo-1,3-dioxoran-4-yl)methyl (meth)acrylate] or polyacrylamide.

3. A solidifying material according to claim 1, which is in a form of particles having an average particles size not greater than 100 μm.

4. A solidifying material according to claim 1, wherein said backing is made of polyethylene or polypropylene.

5. A solidifying material according to claim 1, wherein said backing is a film or sheet of from 1 to 1,200 μm in thickness and of from 95 to 100% in porosity.

6. A solidifying material according to claim 1, further comprising not greater than 85 wt. %, based on said polymer, of an elastomer non-compatible with said electrolyte solution.

7. A cell comprising, as a constituent element, a solidifying material according to claim 1.

* * * * *